(12) United States Patent
Parker et al.

(10) Patent No.: US 7,196,124 B2
(45) Date of Patent: Mar. 27, 2007

(54) ELASTOMERIC MATERIAL COMPOSITIONS OBTAINED FROM CASTOR OIL AND EPOXIDIZED SOYBEAN OIL

(75) Inventors: Harry W. Parker, Lake Jackson, TX (US); Richard W. Tock, Lubbock, TX (US); Fang Qiao, Lancaster, PA (US); Ronald S. Lenox, Lancaster, PA (US)

(73) Assignee: Texas Tech University, Lubbock, TX (US)

( * ) Notice: Subject to any disclaimer, the term of this patent is extended or adjusted under 35 U.S.C. 154(b) by 160 days.

(21) Appl. No.: 10/754,015

(22) Filed: Jan. 8, 2004

(65) Prior Publication Data

US 2004/0192859 A1 Sep. 30, 2004

Related U.S. Application Data

(60) Provisional application No. 60/438,656, filed on Jan. 8, 2003, provisional application No. 60/438,691, filed on Jan. 8, 2003.

(51) Int. Cl.
C08K 3/26 (2006.01)
C08L 63/00 (2006.01)
C08L 63/02 (2006.01)

(52) U.S. Cl. ............ 523/457; 523/446; 523/458; 525/523; 525/524; 525/529; 525/532; 525/533

(58) Field of Classification Search ............ None
See application file for complete search history.

(56) References Cited

U.S. PATENT DOCUMENTS

| | | | | |
|---|---|---|---|---|
| 2,921,040 | A | * 1/1960 | May | 528/111.3 |
| 3,510,489 | A | * 5/1970 | Graham et al. | 264/255 |
| 3,951,714 | A | 4/1976 | Franco | 156/62.2 |
| 4,225,374 | A | 9/1980 | Kaufmann | 156/220 |
| 4,254,002 | A | 3/1981 | Sperling et al. | 260/23 ST |
| 4,605,584 | A | 8/1986 | Herr, Jr. et al. | 428/142 |
| 4,804,429 | A | 2/1989 | Appleyard et al. | 156/209 |
| 4,826,912 | A | 5/1989 | Ko et al. | 524/567 |
| 5,347,296 | A | 9/1994 | Lewicki, Jr. et al. | 346/153.1 |
| 5,670,237 | A | 9/1997 | Shultz et al. | 428/173 |
| 5,700,865 | A | 12/1997 | Lundquist | 524/506 |
| 5,945,472 | A | 8/1999 | Duong et al. | 524/425 |

FOREIGN PATENT DOCUMENTS

| | | | |
|---|---|---|---|
| DE | 1057044 | | 2/1967 |
| DE | 1804364 | A * | 5/1970 |
| DE | 1023393 | | 3/1996 |
| EP | 0 361 170 | | 4/1990 |
| EP | 0 676 432 | | 1/1999 |
| JP | 55129416 | A * | 10/1980 |
| JP | 05132616 | A * | 5/1993 |
| JP | 8-53530 | | 2/1996 |
| SU | 1479474 | A * | 5/1989 |

OTHER PUBLICATIONS

CAPLUS accession No. 1961:134458 for Czech Patent No. 90264, Pektor et al., May 1959.*
CAPLUS accession No. 1987:34138 for the Stroitel'nye Materialy article by Lavrega, vol. 9, 1986.*
CAPLUS accession No. 1989:595992 for the Polymer Communications article by Cuadrado et al., vol. 30, No. 8, 1989.*
CAPLUS accession No. 2000:442219 for Romanian Patent No. 111,782; Tudor et al., Jan. 1997.*
L. H. Sperling and J. A. Manson, *Interpenetrating Polymer Networks from Triglyceride Oils Containing Special Functional Groups: A Brief Review*, JAOCS, vol. 60, No. 11 (Nov. 1983), pp. 1887-1892.
L. H. Sperling, J. A. Manson, and M. A. Linne, *Simultaneous Interpenetrating Networks Prepared from Special Functional Group Triglyceride Oils; Castor Oil, Lesquerella Palmeri and Other Wild Plant Oils*, J. Polym. Mater 1, (1984) pp. 54-67.
Prashant Patel and Bhikhu Suthar, *Interpenetrating Polymer Networks From Castor Oil Based Polyurethanes, XI*, Polymer Engineering and Science, Jul. 1988, vol. 28, No. 14, pp. 901-905.
Padma L. Nayak, S. Lenka, Santosh K. Panda, and T. Pattnaik, *Polymers from Renewable Resources, I. Castor Oil-Based Interpenetrating Polymer Networks: Thermal and Mechanical Properties*, Journal of APplied Polymer Science, vol. 47, pp. 1089-1096 (1993).

* cited by examiner

Primary Examiner—Robert Sellers

(57) ABSTRACT

Elastomers are formed from castor oil and/or ricinoleic acid estolides and a polyester formed from an epoxidized vegetable oil such as ESO and a polycarboxylic acid such as sebacic acid, optionally in the presence of a peroxide initiator, or include crosslinked reaction products derived from ricinoleic acid or castor oil estolides, epoxy group-containing compounds such as epoxy resins and/or epoxidized vegetable oil, epoxy hardeners such as polyamine and polycarboxylic acid hardeners, thermally activated free radical initiators such as peroxides, and optionally but preferably include fillers such as limestone or wood flour. The elastomers can be prepared using a two-step, solvent-less procedure at elevated or ambient temperatures. These predominantly "all-natural" elastomers have physical properties comparable to conventional petroleum-based elastomers and composites and exhibit good flexibility, resiliency, abrasion resistance and inertness to hydrolysis. The resulting elastomers display good mechanical strength and resiliency, are resistant to abrasion and hydrolysis, and can be processed into sheet materials, which makes them attractive as floor covering components.

34 Claims, No Drawings

ELASTOMERIC MATERIAL COMPOSITIONS OBTAINED FROM CASTOR OIL AND EPOXIDIZED SOYBEAN OIL

CROSS REFERENCE TO RELATED APPLICATION

This document claims priority to and benefit of the filing date of provisional application entitled "Elastomeric Products Obtained from Ricinoleic Acid Estolide Compositions" assigned Ser. No. 60/438,656, and filed Jan. 8, 2003, which is hereby incorporated by reference, and co-pending provisional application entitled "New Elastomeric Material Compositions Obtained from Castor Oil and Soybean Oil" assigned Ser. No. 60/438,691, and filed Jan. 8, 2003, which is hereby incorporated by reference.

FIELD OF THE INVENTION

The present invention relates to elastomeric materials formed by crosslinking castor oil and/or ricinoleic acid estolides with polyesters formed by reacting epoxy group-containing materials such as epoxidized soybean oil with polycarboxylic acids, and more particularly to floor coverings, including resilient flooring materials.

BACKGROUND OF THE INVENTION

Most flooring materials are currently prepared from polyvinyl chloride (PVC). PVC usually contains significant amounts of phthalate plasticizers (more than about 30% by weight based on PVC) to produce sufficient flexibility and impact strength for flooring material applications. The flooring materials are typically prepared by thermo-mechanically mixing PVC, phthalate plasticizer, fillers like calcium carbonate and additives followed by a calendering process to prepare the desired flooring sheets. Examples of various processes are described in U.S. Pat. Nos. 4,826,912, 4,804,429, 4,225,374, 3,951,714, 4,605,584, 5,670,237, 5,700,865, and 5,945,472, the contents of which are hereby incorporated by reference. There is an interest in developing alternative renewable materials for use in flooring.

Research has been undertaken in some areas of plastics engineering to use biodegradable materials as reagents in the synthesis of plastic materials. Castor oil is an example of such a material. Castor oil is a natural product produced internationally in commodity quantities. Of all the commercial oils generated from agricultural oil seed products, castor oil exhibits some special characteristics that have made it a dominant commercial vegetable oil. Extracted from the seeds or "beans" of the plant *Ricinus Communis*, which grows in many tropical and warm temperate regions throughout the world, castor oil is one of the few naturally occurring triglycerides that exist in the natural state as a single, pure compound. Castor oil primarily includes the triglyceride of the hydroxyl acid, ricinoleic acid. In fact, ricinoleic acid is typically around 90% of the total triglyceride fatty acids in castor oil and is a commercial material that has multiple functional groups in its molecular structure. The pendant hydroxyl (—OH), the unsaturated, carbon-carbon double bond (—C=C—), and the carboxyl group (—COOH) in ricinoleic acid all provide reactive sites for preparing many useful industrial products.

Sebacic acid and castor oil have been used to form estolide prepolymers (L. H. Sperling and J. A. Manson, JAOCS, 60(11):1887–1891 (1983)). Interpenetrating network polymers have also been generated using castor oil and isocyanates to generate polyurethane-based polymer structures, as described, for example, in U.S. Pat. No. 4,254,002, GB Patent No. 1 057 044, GB Patent No. 1 023 393, AU Patent No. 687982, EP Patent No. 0 361 170, AU Patent No. 1504595, and JP Patent No. 8053530, the contents of which are hereby incorporated by reference. Additional information regarding castor oil urethanes can be found in Sperling et al., J. Polym. Mater. 1,54 (1984), Patel and Suthar, Polym. Eng. Sci., 28, 901 (1988), and Nayak et al., J. Appl. Polym. Sci., 47, 1089 (1993). Examples of interpenetrating networks formed from castor oil include those in which the hydroxy groups in the castor oil are crosslinked with diisocyanate compounds and the double bonds are crosslinked with styrene monomers to form castor oil-based polyurethane interpenetrating polymer networks (IPNs).

Epoxidized soybean oil (ESO), an epoxidized derivative of a naturally occurring vegetable oil, is commonly used as a secondary plasticizer for polyvinyl chloride (PVC) materials. The use of ESO is known to impart flexibility, strength and ultraviolet stability to PVC resin formulations. However, it has not been used to date in combination with castor oil or ricinoleic acid to prepare polymeric materials. Further, IPNs based on ricinoleic acid have not yet been prepared, and those castor oil-based polyurethane IPNs are prepared from extremely toxic and hazardous isocyanate moieties. Extreme care must be used in manufacturing processes that use isocyanates, as exposure to isocyanates is known to be fatal.

In light of the growing environmental awareness, increasing societal concern and new environmental rules and regulations, it would be advantageous to have ecologically friendly materials for flooring applications that provide the flooring with desirable physical and mechanical properties. The present invention provides such materials.

SUMARY OF THE INVENTION

Elastomeric materials derived from ricinoleic acid and/or castor oil, and products including the elastomeric materials, are disclosed. The polymers are formed by reacting castor oil/ricinoleic acid estolides (intermediate polyesters) and polyesters formed from epoxidized vegetable oils such as epoxidized soybean oil (ESO) and polycarboxylic acids such as sebacic acid. A two-step curing process for preparing the elastomeric materials is also disclosed.

The castor oil/ricinoleic acid estolides are formed by esterification reactions involving the hydroxy, carboxylic acid and/or ester functionalities in ricinoleic acid and/or castor oil, and optionally involve crosslinks between olefinic groups in the ricinoleic acid moieties in the polymer backbone formed via free radical initiation catalyzed by thermally activated free radical initiators (crosslinking catalysts).

The polyesters formed via epoxidized vegetable oils and polycarboxylic acids primarily involve reaction of the carboxylic acids and the epoxy groups to form ester linkages, and hydroxy groups formed by cleavage of the epoxy group with carboxylic acid groups to form ester linkages.

The crosslinking between the castor oil/ricinoleic acid estolides and the polyesters involves forming ester linkages, with optional additional crosslinks formed by adding additional polycarboxylic acids, polyamine compounds, polyacrylates or other crosslinkers. The polyamines can form amide linkages by reaction with the carboxylic acid groups, and can form amine linkages by reaction with the epoxy groups. The process yields a polymeric molecular structure described herein as an penetrating polymer networking (PPN). The elastomeric materials are produced in a simple, efficient, environmentally friendly process, in some embodiments using mostly biodegradable components derived from naturally-occurring materials. The naturally-occurring materials include naturally-occurring seed oils, particularly castor oil and its derivatives, such as sebacic acid. Polyacrylates react with double bonds present in the estolides and/or the polyesters to cause crosslinking resulting in the formation of carbon-carbon single bonds.

The process promotes inter-chain or chemical crosslink reactions between linear polyesters that are formed by the polymerization of castor oil and/or ricinoleic acid estolides with a peroxide activator and relatively more complex polyesters generated by reacting epoxidized vegetable oils such as ESO and polycarboxylic acids. A three dimensional, penetrating polymer network (PPN) structure is formed via these delayed crosslink reactions (delayed in the sense that the two polyesters are formed before they are coupled together via the crosslinks) between two already large polymer structures. This creates polymers with desirable mechanical strength and flexibility, which can be used, for example, to form elastomeric sheet flooring materials.

To assure that PPN structures are formed, castor oil and/or ricinoleic acid may first be prepolymerized, optionally in the presence of thermally activated peroxide activators to form a mixture of viscous, liquid estolides. The castor oil/ricinoleic acid prepolymers are mixtures of linear, cyclic and lightly cross-linked polyester structures. Ricinoleic acid dimers and trimers, lactones, lactides, and other simple esters are also present. When subjected to elevated temperatures in the presence of suitable catalysts, self-condensation polymerization reactions occur within the castor oil/ricinoleic acid molecules in which the hydroxyl group of one molecule reacts with a carboxyl group of another molecule and so on to form linear ester linkages.

Meanwhile, activated by peroxide, free radical reactions can also attack the double bond of the molecules forming castor oil and form additional linkages in the castor oil prepolymer. Optionally, polycarboxylic acids (including dicarboxylic acids) can be used to form slightly crosslinked castor oil prepolymers/estolides. These castor oil/ricinoleic acid estolides function as intermediates for further polymerization reactions with the second polymer pair (the polyester formed by reacting epoxidized vegetable oil and polycarboxylic acids) during the formation of the PPN structures.

Advantageously, the second polymer pair is formed from functionalized derivatives of naturally-occurring vegetable oils, such as epoxidized soybean oil (ESO) and sebacic acid (which can also be derived from castor oil). ESO can be used, for example, to add potential cross link sites in the final PPN structures and as a "natural" alternative replacement of petroleum-based organic monomers. The high epoxy value (usually >6%) in ESO assures the availability of sufficient reaction sites for adding to the molecular structure or generating PPN structures. Moreover, since ESO is a natural and renewable raw material, its use increases the natural component in the elastomers that are generated. In one embodiment, the second polymer pair is formed in situ in the presence of the castor oil/ricinoleic acid prepolymers by placing the estolides, the polycarboxylic acids and the epoxy group-containing materials in a reaction vessel.

The elastomers described herein can be produced by a simple, efficient environmentally friendly process. The rubber-like elastomers can find use as surface coverings such as floor and wall coverings and similar sheet materials. Additionally, they can be molded into non-sheet materials for use in automotive, and other applications.

A two-step curing process for preparing the elastomeric materials, are also disclosed. The process yields a polymeric molecular structure known as a penetrating polymer networking. The elastomeric materials are produced in a simple, efficient, environmentally friendly process, using biodegradable components derived from naturally-occurring materials.

The first step in the process involves preparing prepolymers from ricinoleic acid and/or castor oil. The prepolymers include dimer and trimer esters of ricinoleic acid and/or castor oil, lactones, lactides, simple esters and higher molecular weight linear or cyclic ester compounds. The stepwise dimerization, trimerization and/or polymerization of ricinoleic acid and/or castor oil can be realized using enzymatic catalysis and/or acid catalysis, typically under conditions of increased temperature. In either case, a water molecule is formed as a by-product when a hydroxy group and a carboxylic acid group combine to form each ester linkage. However, when enzymatic catalysis is used, the pre-polymer estolides are predominantly linear polyesters, due to the enzyme's stereochemical specificity and regioselective control. Optionally, dicarboxylic acids such as sebacic acid, tricarboxylic acids such as citric acid and/or polycarboxylic acids can be reacted with the ricinoleic acid and/or castor oil to form the estolide prepolymers.

The estolides can be further treated with thermally activated free radical generating catalysts (crosslinking catalysts), such as peroxide activators, to crosslink the double bonds in the ricinoleic acid moieties in the pre-polymer backbone. Olefin-containing crosslinking agents such as divinyl benzene can optionally be added to increase the degree of crosslinking. However, in one embodiment, the double bonds in the ricinoleic acid are not crosslinked, but rather, the crosslinking in the penetrating network occurs through reaction of hydroxy, amine, carboxylic acid and/or thiol functional groups in the prepolymer, epoxy group-containing compounds and/or crosslinking agents such as polyamines, polycarboxylic acids, thiols, phenols, and the like.

Epoxy group-containing compounds such as epoxy resins and/or epoxidized vegetable oils are conjugated to the estolide prepolymer by reacting carboxylic acid or hydroxy groups on the ricinoleic acid moieties in the polymer backbone, or alternatively with carboxylic acid groups on other carboxylic acid moieties used to prepare the estolides, with the epoxy group-containing compounds. The unreacted epoxy groups are then crosslinked using traditional epoxy hardeners, such as polyamines, polycarboxylic acids, phenols, thiols, and the like. Amine groups, when present, can also react with carboxylic acid groups to form amide linkages.

The curing reactions can therefore be visualized as a dual crosslinking reaction in bulk, plus ancillary carboxyl-amine reactions at the interfacial regions. The crosslinked epoxy groups form a penetrating polymer network, while the free-radical initiated crosslinking reactions involving the double bond structures in the main chain of the ricinoleic acid estolides simultaneously form inter-regional chemically bonded structures. In addition, when excess amounts of amine (i.e., more than is required to harden the epoxide groups) are present, the amine groups can react with the carboxyl groups on the ricinoleic acid molecules, which can enhance the compatibility of the predominantly ricinoleic phase with the growing epoxy phase. The result is an elastomeric, dual penetrating polymer network structure.

The desired effect is to generate independent crosslinking reactions across interfacial regions between the different homopolymers. One network structure can be generated by diamine-initiated cross-links in epoxy resin (or similar crosslinks when other epoxy hardeners, such as thiols, phenols and carboxylic acids are used), while another crosslinked structure is being formed by peroxide-induced free radical cross-links of unsaturated double bonds in the ricinoleic acid estolides. In addition, if excess polyamine hardener is used, a carboxyl-amine reaction is possible between ricinoleic acid and the diamine that promotes additional interfacial stability and structure.

In one embodiment, the elastomeric material is prepared by simultaneously mixing all of the components, partially polymerizing the reactive constituents, then more completely polymerizing the material, while simultaneously forming the penetrating network. Fillers, such as limestone and/or wood flour, and other additives commonly used to prepare filled elastomeric materials, can also be present. The fillers are advantageously added after the first step in the polymerization reaction (i.e., the estolide formation). The fillers can be present in an amount between 0 and about 90% by weight of the polymeric materials, and are typically present in an amount of between about 40 and about 60% by weight when used as components in sheet flooring materials.

The estolides, epoxy group-containing compounds, crosslinking catalysts and hardeners all react to form elastomeric penetrating networks that have desirable tensile strength and elongation properties for use as sheet goods and other products in which elastomeric materials are traditionally used. Examples of the products include surface coverings such as floor and wall coverings and similar sheet materials, and products formed by molding the elastic materials into non-sheet form, including materials for use in automotive and other applications.

In one embodiment, a mixture of a ricinoleic acid estolide prepolymer, an epoxy resin, and lesser amounts of a polyamine hardener and a thermally activated free radical catalyst, methyl ethyl ketone (MEK) peroxide are stirred for about ten minutes (10 min.) while a mild exothermic polymerization reaction occurs. A desired amount of filler, for example, up to sixty per cent (60%) by weight in one embodiment, is then charged to this reaction mixture, and the filler mass helps to blunt an excursion of any auto-catalytic exotherm. The entire reaction mixture is stirred for approximately another ten minutes (10 min.), at which point the mixture is ready to be cast, molded, or otherwise formed into a final product configuration. Examples of processing options include, calendaring, die coating, extrusion, and the like. Thereafter, the mixture is subjected to additional curing reactions, which can be accelerated by heating at elevated temperature.

DETAILED DESCRIPTION OF THE INVENTION

The elastomeric materials described herein are penetrating polymer networks (PPNs), i.e. a polymer comprising two or more networks, which are at least partially interlaced on a molecular scale and typically are covalently bonded to each other and cannot be separated unless the chemical bonds are broken. The elastomeric materials contain moieties derived from castor oil and/or ricinoleic acid, and can also include moieties derived from polycarboxylic acids, epoxidized or otherwise functionalized vegetable oils, and/or polyamines.

The elastomeric materials, the polyesters used to prepare the elastomeric materials, products comprising the elastomeric materials, and processes for preparing the elastomeric materials will be better understood with reference to the following description.

I. Components Used to Prepare the Elastomeric Materials
  A. Castor Oil and/or Ricinoleic Acid Estolides The initial step involved in preparing the elastomeric materials is to prepare castor oil and/or ricinoleic acid estolides, or prepolymers. Castor oil is a natural oil that occurs in the seeds of castor beans that are grown in great quantities in many parts of the world, such as India, Brazil and China. Castor oil is unique among all the seed oils in that it is the only commercially important oil composed predominantly (>90%) of a hydroxyl, unsaturated, C18 fatty acid, called ricinoleic acid, which is an 18-carbon acid having a double bond at the 9–10 carbon position and a hydroxyl group on the number twelve carbon atom. This unique combination of a hydroxyl group and an unsaturated carbon double bond impart castor oil with reactive groups that can participate in potential polymerization reactions. Ricinoleic acid (along with glycerol as a by-product) is formed by the carefully controlled hydrolysis of refined castor oil. In one embodiment, the ricinoleic acid used as the starting material can also contain dimer, trimer, and higher homolog ester structures.

The liquid estolide mixture generated from castor oil and/or ricinoleic acid includes mutually soluble linear, cyclic, and lightly cross-linked (i.e., not sufficiently crosslinked such that the estolide mixture is a solid) polyester moieties generated from stepwise esterification and optional chain polymerization of the double bond when peroxide is used as a crosslinking catalyst in the estolide prepolymer synthesis.

In addition, unreacted castor oil can of itself form dimers and/or trimers or provide further reaction sites for cross-linking with epoxidized monomers. With these polyester prepolymers, relatively high molecular weights and higher crosslinking densities can be essential for successfully preparing the elastomeric material. Generally, prepolymers with room temperature viscosities greater than about 3000 cps have been found useful.

Ester Formation via an Enzymatic Processes

The hydroxy and carboxylic acid groups in the ricinoleic acid can be esterified using an acid catalyst or an enzymatic catalyst. Polymer syntheses using isolated enzyme catalysts have received much scientific attention as an environmentally benign processes for polymer production under mild reaction conditions. For example, biodegradable aliphatic polyesters have been synthesized from various monomers using lipase catalysts. Moreover, enzymatic polymerization may be conducted in different media including both aqueous and organic based systems as well as solvent free systems. In one embodiment, enzyme polymerization is conducted in a non-aqueous and solvent free medium excluding organic based solvents.

As with any enzyme-catalyzed polymerization process, a microorganism producing the enzyme for the desired polymer synthesis must be identified. Although involving no more than routine experimentation, this selection process can require screening, particularly to optimize enzymatic activity, which in this case is based on selectivity for ricinoleic acid. For example, the lipase derived from *Candida Antarctica* B is an efficient esterification catalyst capable of producing ricinoleic acid estolides. Time-resolved enzyme-distribution techniques can be used to help control the agitation profile, since the polymerization can be and is advantageously achieved without using a solvent, and the viscosity of the reaction mixture increases as polymerization (by esterification) proceeds.

After enzyme-catalyzed polymerization for a suitable period of time at a suitable temperature, for example, seventy two (72) hours at room temperature, the viscous, liquid prepolymer can assume a light brown color. After the enzyme-catalyzed polymerization procedure, the prepolymer composition typically includes simple esters or estolides, linear and cyclic, plus the dimers, trimers, higher homologs and unreacted ricinoleic acid in the original feedstock. Variation in the magnitude of the apparent viscosity of the mixture is an indication of the increase in molecular weight with prepolymer formation, which can be an important parameter in the preparation of the elastomeric material. If the apparent viscosity is too low following polymerization with the enzyme, then the prepolymer which is formed may only be useful as a plasticizer or result in a soft friable material when further cured. As such, it may lack the required mechanical properties of toughness and flexibility needed for some applications. The molecular weight or apparent viscosity of the prepolymer should be sufficiently elevated to be successfully used as a starting material to prepare elastomers with the requisite mechanical properties and flexibility for use in flooring compositions. Generally, prepolymers with room temperature viscosities greater than about 3000 cps have been found useful.

Enzyme Formation Via Acidic Catalysis

If an acidic catalyst is used, the catalyst can be virtually any Bronsted or Lewis acid capable of catalyzing esterification reactions. Preferably, the catalyst is soluble or at least dispersible in the reaction mixture. Para-toluene sulfonic acid (p-TSA) is an example of a suitable catalyst.

During the esterification reaction, regardless of whether chemical or enzymatic esterification conditions are used, vacuum or reduced pressures can be used to facilitate removal of water formed by esterification and enhance the conversion of ricinoleic acid to the polyester estolides.

Linear polyesters can be obtained by reacting castor oil and/or ricinoleic acid at a sufficiently high temperature where the hydroxyl group of ricinoleic acid or the ricinoleic acid in castor oil reacts with the carboxyl group of another molecule to form a polyester linkage. Moreover, when initiated with peroxide, a free radical polymerization can also occur at the unsaturated double bond, which effectively links adjacent castor oil/ricinoleic acid molecules. Thus, castor oil and/or ricinoleic acid can be polymerized to produce a viscous liquid that includes the estolides, which function as an intermediate material for further polymerization reactions.

Thermally Activated Free Radical Catalysts

While the ester linkages are being formed, additional crosslinks can be formed in the castor oil/ricinoleic acid estolides by coupling two or more of the double bonds in the polymer backbone via free radical polymerization initiated via a thermally activated free radical initiator (a crosslinking catalyst). The crosslinking of the unsaturated double bonds effectively link adjacent ricinoleic acid molecules or other components of castor oil. Thus, castor oil and/or ricinoleic acid can be polymerized to produce a viscous liquid that includes the estolides, which function as an intermediate material for further polymerization reactions.

Any thermally activated free-radical catalysts capable of crosslinking the olefin groups present in the castor oil or ricinoleic acid (and/or other olefin group-containing materials) can be used. Such catalysts are well known to those of skill in the art, and include, for example, one or more of (1) 2,5-dimethyl-2,5-di(tert-butylperoxy)hexane, (2) 1,4-di-(2-tert-butylperoxyisopropyl)benzene, tert-butyl cumyl peroxide, (3) di-tert-butyl peroxide, (4) 2,4,4-trimethylpenty-2-hydropercxide, (5) diisopropylbenzene monohydroperoxide, (6) cumyl hydroperoxide and (7) azobisisobutyronitrile (AIBN). In one embodiment, 2,5-dimethyl-2,5-di(tert-butylperoxy)hexane peroxide, whose trade name is Triganox 101-45B, as the catalyst.

Peroxides used as free radical polymerization initiators can advantageously be activated at room temperature: such as methyl ethyl ketone (MEK) peroxide. Other peroxides such as di-tert-butyl peroxide, dibenzoyl peroxide and dicumyl peroxide can be used for curing at elevated temperatures. In one embodiment, levels of about one tenth to about five percent based on weight of the composition were used. In another embodiment, other peroxides, which exhibit a half-life of 10 hours or less at 25° C., may also be utilized. In yet another embodiment, mixtures of peroxides with different activation temperatures are utilized.

The molecular weight and degree of polymerization in the prepolymer estolides can be important considerations in preparing the elastomeric materials. In one embodiment, a combination of a heat-activated free radical catalyst, such as a peroxide, and an acidic catalyst, such as p-TSA, effectively activate the polymerization of castor oil and/or ricinoleic acid to form estolides.

The liquid estolide mixture generated from castor oil and/or ricinoleic acid includes mutually soluble linear, cyclic, and lightly cross-linked (i.e., not sufficiently crosslinked such that the estolide mixture is a solid) polyester moieties generated from stepwise esterification and chain polymerization of the double bond when peroxide is used as a crosslinking catalyst in the estolide prepolymer synthesis.

In addition, unreacted castor oil can of itself form dimers and/or trimers or provide further reaction sites for crosslinking with epoxidized monomers. With these polyester prepolymers, relatively high molecular weights and higher crosslinking densities can be essential for successfully preparing the elastomeric material. Generally, prepolymers with room temperature viscosities greater than about 3000 cps have been found useful.

Olefin-Containing Crosslinking Agents

In one embodiment, olefin-containing crosslinking agents, such as divinyl benzene and other diolefins and/or polyolefins are present to provide further crosslinking.

Polycarboxylic Acids

In addition to the castor oil and/or ricinoleic acid, one or more polyfunctional carboxylic acids can also be used to form slightly crosslinked estolide prepolymers. These estolide prepolymers function as intermediates for further polymerization reactions with the second polymer pair during the formation of the PPN structures. Polycarboxylic acids have the general type formula:

where x equals or is greater than 2 and R equals aliphatic, cycloaliphatic, or aromatic moieties. In one embodiment, the polycarboxylic acid has from two to fourteen carbon atoms, for example, oxalic acid, succinic acid, fumaric acid, malonic acid, maleic acid, adipic acid, pimelic acid, suberic acid, azelaic acid, sebacic acid, brassylic acid, thapsic acid. Sebacic acid, a dicarboxylic acid, can be produced by alkali fussion of castor oil, and can be preferred for use in generating the elastomeric materials described herein.

In yet another embodiment, the polycarboxylic acid is trifunctional or is a hydroxycarboxylic acid, with from 2 to 14 carbon atoms. Examples of such carboxylic acids include glycol acid, lactic acid, 2-hydroxybutyric acid, 2-hydroxy isobutyric acid, 2-hydroxy caproic acid, citric acid, maleic acid, and 2-hydroxy isocaproic acid. The tri-fuictional acid citric acid is a preferred crosslinker because it is a natural compound found in all citrus fruits.

Optionally, organic alcohols, advantageously diols or polyols, can also be added to produce estolide prepolymers. Organic amines can also be used, producing viscous prepolymers containing amide functionality. If desired, a low degree of free radical polymerization of the unsaturated double bond can be used to prepare the estolide prepolymers.

B. Polyesters Formed from Epoxy Group-Containing Materials and Polycarboxylic Acids The other pre-polymer polyester material used to prepare the castor oil penetrating polymer network (PPN) is formed by reacting epoxy group-containing materials, primarily epoxidized vegetable oils such as ESO, with polycarboxylic acids, optionally in the presence of polyamines. The epoxy group-containing components of this reaction are described in detail below; the polycarboxylic acids have been described above in connection with the castor oil/ricinoleic acid estolides. The polyester can be formed in situ in the presence of the estolides.

Epoxidized or Otherwise Functionalized Materials

The second polyester pre-polymer can be formed by reacting an epoxy group-containing compound, such as an epoxy resins and/or an epoxidized vegetable oil, with a polycarboxylic acid. The resulting pre-polymer can be further crosslinked by virtue of the reactive epoxy groups and/or carboxylic acid groups, which are reacted with carboxylic acid and/or hydroxy groups in the castor oil/ricinoleic acid estolide. In one embodiment, the intermediate polyesters are formed from reaction mixtures including functionalized vegetable oils, such as epoxidized vegetable oils, such that the epoxy or other functional groups allow for further crosslinking in addition to the crosslinking provided by the olefin functionality on the castor oil monomers.

In another embodiment, the estolides are reacted with epoxy group-containing compounds, such as epoxy resins and/or epoxidized vegetable oils to form a species that can be further crosslinked by virtue of the reactive epoxy groups. In one embodiment, the intermediate polyesters (estolides) are formed from reaction mixtures including castor oil and/or ricinoleic acid and functionalized vegetable oils, such as epoxidized vegetable oils, such that the epoxy or other functional groups allow for further crosslinking in addition to the crosslinking provided by the olefin functionality on the castor oil monomers.

Epoxidized vegetable oils are natural vegetable oils that have been chemically functionalized. One such functionalized vegetable oil is epoxidized soybean oil (ESO). One example of a polycarboxylic acid is sebacic acid, which can also be derived from castor oil. ESO is environmentally friendly and biodegradable. ESO has several purposes. It can improve the flexibility of the final polymer product through ESO's function as a plasticizer of the stiff epoxy phase, and can improve the mechanical strength of the final polymer by forming chemical crosslinks between the epoxy groups of the ESO and other reactive components, such as polyamines or polycarboxylic acids. The use of ESO increases the natural component composition of the finished PPN elastomer product. The functionalized vegetable oils also add potential crosslink sites in the final PPN structures and act as "natural" alternative replacements of at least a portion of the petroleum-based organic monomers that can also be used to form the intermediate polyesters. The high epoxy value (usually >6%) in ESO assures the availability of sufficient reaction sites for adding to the molecular structure or generating PPN structures. Moreover, since ESO is a natural and renewable raw material, its use increases the natural component in the elastomers that are generated. Soybean-oil based products, including ESO, tend to be relatively non-toxic, biodegradable, tend not to persist in the environment, and come from natural, renewable sources.

The epoxide groups in ESO can react to form polyester linkages with polycarboxylic acids, such as sebacic acid. The reaction between the epoxide groups of ESO and carboxylic acid groups are a step-growth reaction. The presence of three or more epoxy groups on the vegetable oil molecule leads to network formation when reacted with a polyacid. In addition, the hydroxyl groups formed during the reaction, and the hydroxyl groups present on the main chain of the castor oil provide a possible locus of further reactions and PPN formation.

Epoxy resins can also be used in combination with the epoxidized vegetable oils, or with the castor oil estolides or ricinoleic acid estolides. In one embodiment, a polyfunctional epoxy resin, commercially available diglycidyl ether of bisphenol A or DGEBA epoxy resin, is used. In one example, DGEBA is used at a level of about three to about fifteen percent by weight of the composition. In another example, the epoxy resin is the tetrafunctional epoxy resin tetraglycidal diaminodiphenyl methane (TGDDM), and is used at a level of about three to about fifteen percent by weight of the composition.

The epoxy group-containing molecules and the polycarboxylic acids are reacted at a suitable temperature and pressure to crosslink the starting materials and form an intermediate polyester.

Crosslinkers

The epoxidized vegetable oils provide crosslinkable sites (after reaction with the polycarboxylic acids) that can be used to crosslink with and form PPN structures by reacting the epoxy groups in the epoxidized vegetable oils with the carboxylic acid groups and/or hydroxy groups in the castor oil/ricinoleic acid estolide prepolymers.

Any suitable polyamine used to crosslink (harden) epoxy resins can be used. Examples of suitable polyamine crosslinkers include cycloaliphatic diamines such as: (1) isophoronediamine, (2) 1,2-diaminocyclohexane, (3) bis-p-aminocyclohexyl-methane, and 1,3-bis(aminomethylcyclohexanemine) cycloaliphatic diamines, (4) triethylene glycol diamine, (5) 1,5-diaminopentane(cadaverine) and (6) 1,4-diaminobutane(putrescine). Triethylene glycol diamine can also be used. In one embodiment, the polyamine is present at a concentration of three to fifteen percent (3–15%) by weight of the reaction mixture. Other concentrations can be used depending upon physical properties, and cure times desired.

Any suitable polyacrylate that can crosslink with carbon-carbon double bonds can be used. An example of suitable polyacrylate is a tetra-acrylate, such as Ebecryl® 140 sold by UBC Chemicals Corp. of Smyrna, Ga.

Epoxy Hardeners

Any suitable epoxy hardener can be used. Examples include polyamines, polycarboxylic acids, thiols (preferably with two or more thiol groups), phenols (again, preferably with two or more phenol groups) and the like. Examples of suitable hardeners include cyclo-aliphatic diamines, such as isophoronediamine, 1,2-diaminocyclohexane, bis-p-aminocyclohexylmethane, and 1,3-BAC (bis-aminomethyl cyclohexane) high reactive cycloaliphatic diamines, or a mixture of diethylenetriamine. The hardener is typically used in a concentration of about three to about fifteen percent (3–15%) by weight of the epoxy hardener.

Thermally Activated Free Radical Catalysts

Any thermally activated free-radical catalysts capable of crosslinking the olefin groups present in the castor oil or ricinoleic acid (and/or other olefin group-containing materials) can be used. Such catalysts are well known to those of skill in the art, and include, for example, one or more of (1) 2,5-dimethyl-2,5-di (tert-butylperoxy) hexane, (2) 1,4-di-(2-tert-butylperoxyisopropyl) benzene, tert-butyl cumyl peroxide, (3) di-tert-butyl peroxide, (4) 2,4,4-trimethylpentyl-2-hydroperoxide, (5) diisopropylbenzene monohydroperoxide, (6) cumyl hydroperoxide and (7) azobisisobutyronitrile (AIBN). In one embodiment, 2,5-dimethyl-2,5-di(tert-butylperoxy) hexane peroxide, whose trade name is Triganox 101-45B, is the catalyst.

Peroxides used as free radical polymerization initiators can advantageously be activated at room temperature: such as methyl ethyl ketone (MEK) peroxide. Other peroxides such as di-tert-butyl peroxide, dibenzoyl peroxide, dicumyl peroxide, etc. can be used for curing at elevated temperatures. In one embodiment, levels of about one tenth to about five percent (0.1–5%) based on weight were used. In another embodiment, other peroxides, which exhibit a half-life of 10 hours or less at 25° C., may also be utilized. In yet another embodiment, mixtures of peroxides with different activation temperatures are utilized.

Filler

Any filler commonly used in conjunction with polymeric materials, for example, those used in the flooring industry, can be used. The filler is advantageously added after the estolide is formed, but could be present while the PPN structure is being formed. This is true whether the estolide pre-polymer is reacted directly with the second polymer, or whether the estolide pre-polymer is reacted with an epoxy group-containing moiety and a polycarboxylic acid, where the second polymeric species is produced in situ.

Whiting filler can be used to increase opacity. The optical properties of titanium dioxide make it a particularly good pigment in obtaining a white color with good opacity. Lower levels of titanium dioxide can be employed if a white filler such as calcium carbonate is used at moderate levels in this layer.

Calcium carbonate is of particular utility. Hardness, stiffness, heat deflection temperature, slip resistance, stress crack resistance, weldability, printability, and antiblock characteristics are all improved. Thermal shrinkage and elongation, as well as water vapor and oxygen permeability are decreased.

Talc is another filler well suited to enhance the polymeric materials for use in floor coverings. It has a lamellar structure in contrast to the low aspect particulate structure of calcium carbonate. This lamellar form allows talc to be more effective than calcium carbonate with regard to increasing stiffness, heat deflection temperature and dimensional stability. The disadvantage of talc relative to calcium carbonate center on reduced impact strength, matt surface, and lower thermo-oxidative stability. Mica also has a lamellar structure and has similar advantages and disadvantages.

High aspect ratio fillers/reinforcements such as wollastonite and glass fibers, can have an even stronger effect than talc and mica on increasing the modulus of elasticity, tensile strength, and heat-distortion temperature of the elastomeric materials described herein.

The improvements provided by high aspect ratio inorganic additives would be of particular assistance in these floor covering systems made using a permanent plasticizer or processing aid, such as liquid paraffin. In these cases, the stiffening action of such additives would compensate for the loss of stiffness produced by the liquid paraffin.

Silica in its fumed or precipitated forms can be useful at low levels (0.1 to 1.5%) in the elastomeric materials where antiblocking and printability is of importance. In the floor covering system these would be in the wear layer and in the layer upon which the printed design is applied.

Alumina trihydrate and magnesium hydroxide, in the correct particle sizes that for most systems are less than 40 microns in diameter, can provide the same type of property enhancement provided by calcium carbonate. In addition, they can provide useful fire resistance and smoke control characteristics.

The polymeric materials, when used in floor covering systems, can be enhanced by using thermal and light stabilizers. For thermal stabilizers the amount and type that should be used will vary with the actual process used to fabricate the final structure. The melt spreader approach can provide a product having less heat history than either the melt calendering or extrusion routes. In some cases, however, the polymeric materials can be exposed to temperatures over 200° C. for some time during the process.

Suitable stabilizers include hindered phenol, optionally with co-stabilizers such as organosulfur compounds, for example, distearylthiodipropionate (DSTDP). Good thermal stability can be obtained using a high molecular weight hindered phenol, such as Irganox 1010 from Ciba-Geigy, with one or more secondary antioxidants such as thioethers and phosphorus compounds. DSTDP and Ultranox 626 from GE are examples of these types of materials. An effective thermal stabilizer package from such systems is 0.1% Irganox 1010, 0.1% DSTDP and 0.05% Ultranox 626.

Hindered amine light stabilizers (HALS) are particularly effective in protecting the polymers from photo-oxidation. A Polymeric HALS, such as Luchem HA-B18 from Atochem, is particularly effective in its own right and has the added advantage of showing no antagonism for other additives such as DSTDP. The inclusion of 0.3% of Luchem HA-B18 in the outer wear layer and 0.15% in the layer just below the transparent wear layer will greatly enhance the light resistance of the floor covering.

Lubricants and processing aids can be used to manufacture the flooring. This will be very dependent on the specific process. For extrusion or melt calendering operations an external lubricant may be of assistance. Calcium and zinc stearate are appropriate as external lubricants. They also can provide some additional stabilization support. They can be added in the 0.1 to 1.0%, preferably 0.2 to 1.0% range is needed.

Processing aids may be used in polymeric materials to adjust or accentuate particular processing characteristics such as reduced energy requirements and/or increased processing speed.

The flammability and smoke generation of the polymeric materials, polymeric sheets and floor coverings including the polymeric sheets can be improved using various additives. Various inorganic compounds, such as aluminum trihydrate and magnesium hydroxide, give off water at elevated temperatures are useful as dual fillers/flame retardants. Phosphorous compounds, borates, and zinc oxide all can play useful roles in improving the fire characteristics of polylactic acid-based systems.

Other additives that can be included in the polymeric material include dyes, inks, antioxidants, etc. which are generally used in relatively small amounts at less than 50 PHR.

Anti-static characteristics can also be important for some applications. Many anti-static additives are compounds with hydrophilic and hydrophobic sections. A common material of this type is a mono ester of a polyol, such as glycerol, with a long chain fatty acid, such as stearic acid.

Rosin can also be added.

II. PPN Synthesis

The PPN structures are advantageously prepared in a two-step curing process. The first step in the curing procedure involves heating a composition including the two pre-polymers or the estolide and the epoxy group-containing molecule and polycarboxylic acid under an inert nitrogen blanket until a gel like liquid is formed. The gel can then be pre-cured under pressure in a parallel platen mold or in a shaped mold.

There are several advantages to pre-curing the castor oil to form an intermediate polyester (estolide) material before crosslinking the intermediate to form the penetrating networks. The formation of polyester linkages at high temperature is a condensation reaction, forming water as a by-product. The water can leave voids in the gelatinized structure, and any voids must be removed to maintain the structural integrity of the final product. Performing the pre-curing step under pressure minimizes void formation. Further, the step-growth reaction to form the penetrating polymer network (PPN), for example, the reaction between ESO and sebacic acid, is a time-controlled process. The former reaction may require some time before the system achieves a gel point. Only after the gel point is reached does the composition have sufficient viscosity to prevent it from flowing out of an open mold when a slight pressure is applied.

The estolide can be reacted with an epoxide group-containing material, such as an epoxy resin and/or an epoxidized vegetable oil, and then crosslinked at relatively high temperatures, and at pressures of from 1 to 3 atmospheres, to form the elastomeric material. The crosslinking can occur by reacting the pendant epoxy groups with hardeners (epoxy curing agents) such as polyamines, polycarboxylic acids, thiols and phenols, as such are known in the art. If a thermally activated, free radical initiator (crosslinking catalyst) is present, it can also crosslink the double bonds in the ricinoleic acid moieties in the polymer backbone. In one embodiment, olefin-containing crosslinking agents, such as divinyl benzene and other diolefins and/or polyolefins are present to provide further crosslinking.

The elastomeric material can be synthesized using a two-step curing process. The first step in the curing procedure involves heating a composition including the castor oil (or ricinoleic acid) in the presence of an acidic catalyst and/or a thermally activated free radical polymerization catalyst, under an inert nitrogen blanket until a gel like high viscosity liquid or semi-solid is formed. This material can then be cured in a finishing step under pressure, for example, in a parallel platen mold.

The estolide is typically present in an amount of between about 20 and about 80 percent by weight of the reaction mixture. The epoxy group-containing material is typically present in an amount of between about 20 and about 80 percent by weight of the reaction mixture. The hardener or crosslinker is typically present in an amount of between about 2 to about 20 percent by weight of the reaction mixture. The crosslinking catalyst is typically present in an amount of between about 0.1 to about 5 percent by weight of the reaction mixture.

Typically, the pre-cure time can be in the range of about 20 to about 60 minutes, but this can be adjusted depending upon composition and catalyst. In one embodiment, the pre-cure time is about 30 minutes. Also the invention teaches that network structures can be generated by polyamine-initiated cross-links to the ESO structure at the same time other cross-linked structures are being formed by peroxide induced free radical cross-links of unsaturated double bonds in the castor oil estolides. In addition, if a polyamine hardener or crosslinker is utilized, a carboxyl-amine reaction is possible between the acid sites and the polyamine. This latter reaction promotes additional interfacial stability and structure to the final elastomer product. In one embodiment, one or more polyamines can be used. In another embodiment, the polyamine(s) can be cyclo-aliphatic diamines such as: (1) isophoronediamine, (2) 1,2-diaminocyclohexane, (3) bis-p-aminocyclohexyl-methane, and 1,3-BAC (bisaminomethyl cyclohexane) high reactive cycloaliphatic diamines, (4) triethylene glycol diamine, (5) 1,5-diaminopentane(cadaverine) and (6) 1,4-diaminobutane(putrescine). In another embodiment, triethylene glycol diamine is used. In one embodiment, a concentration of about three to about fifteen percent by weight is used for the polyamine cross-link agent. Other concentrations can be used depending upon physical properties, and cure times desired. Pre-cure temperatures with the polyamines typically range from about 140 to about 220° C., although temperatures outside this range can be used. In one embodiment, pre-cure temperatures of about 200° C. to about 205° C. are used.

The various physical and mechanical properties of the elastomeric material can be varied by changing the relative amounts of ricinoleic acid prepolymer (from those described separately above), the epoxidized vegetable oil such as ESO, the crosslinker, the crosslinking catalyst, such as MEK peroxide or benzoyl peroxide, that are present in the reaction vessel. The "natural" content of the polymeric material can be increased by using epoxidized vegetable oils, such as ESO, rather than petroleum-based epoxy resins.

In one embodiment, where the cure occurs at room temperature, the reaction mixture includes a mix of equal amounts by weight of ricinoleic acid or castor oil estolides, epoxy resin, and diamine crosslinker, plus 0.1% MEK peroxide. These ingredients are added to a reaction vessel and sufficiently stirred to assure homogeneous mixing of the ingredients. Then, following the initial temperature rise from the exothermal polymerization reaction, a desired amount of filler (typically between 0 and about 80 percent by weight of the polymer components, more typically between about 40 and about 60 percent by weight) is added to the mixture with continued agitation until a gel or viscous liquid is formed. A portion of this viscous liquid can be placed between the parallel platens of a hydraulic press, and the sample cured for approximately twelve (12) hours or overnight at a slight pressure (typically between about one and about three atmospheres) at room temperature. The pressed sample can be post cured at a platen temperature of about 60° C. for about four hours before the pressure is released on the mold. It can be important not to release the mold pressure until after the press and sample have adequately cooled, for example, for approximately 30 minutes. A more rapid curing of the sample is possible, for example, by post curing for about two hours at about 80° C.

In another example, additional time can also be saved using a heat cure. Using this approach, the mixture of ricinoleic acid estolides with epoxy resin, and epoxidized vegetable oil, such as ESO, are placed in a reaction vessel and stirred strongly at ambient temperature. Then, a desired amount of filler, about ten percent by weight diamine crosslinker and about two percent dibenzoyl peroxide are all added to the mixture, which is stirred until a gel or viscous liquid is formed. As before, the viscous liquid can be cured under slight pressure, but at about 120° C. for about four hours and then post cured at about 60° C. for about four hours. Again the platen pressure is advantageously not released until after the mold has cooled to within about ten degrees of room temperature. While not wishing to be bound to a particular theory, it is believed that maintaining the pressure until the reaction vessel has cooled maintains the shape of the polymeric material during the curing process, that is, while water is released as a by-product and before the material has had a chance to fully harden.

As an example of a typical synthesis, the desired amount of castor oil prepolymer, as described separately above, epoxidized soybean oil, and sebacic acid were charged to a reaction vessel. This mixture was brought to 142° C. and held under strong agitation for about 30 minutes or until an amber colored solution was obtained. The required amounts of peroxide were added to the hot mixture under continued agitation for about 5 minutes, after which a crushed limestone filler was added. This mixture was then transferred to a Petri dish, and heated to 200° C. under a nitrogen blanket for 30 minutes until an immobile structure was obtained. This semi-solid mass was then placed in a rectangular sheet mold, which was then placed in a parallel platen press and cured for about 4 hours. In this synthesis process, the starting material is taught to be castor oil with about 80% to about 90% ricinoleic acid and a viscosity range of 63 to 69 centipoises at 25° C. Epoxidized soybean oil was the vegetable oil in this example, but other epoxidized vegetable oils, such as acrylated epoxidized soybean oil (AESO), maleinized soy oil monoglyceride (SOMG/MA), or methyl epoxidized soyate (MESO) are also usable.

In one embodiment, one or more peroxide activators can be used, such as (1) 2,5-dimethyl-2,5-di(tert-butylperoxy) hexane, (2) 1,4-di-(2-tert-butylperoxyisopropyl)benzene, tert-butyl cumyl peroxide, (3) di-tert-butyl peroxide, (4) 2,4,4-trimethylpentyl-2-hydroperoxide, (5) diisopropylbenzene monohydroperoxide, or (6) cumyl hydroperoxide. In another embodiment, 2,5-dimethyl-2,5-di(tert-butylperoxy) hexane peroxide, whose trade name is Triganox 101-45B, is the catalyst. The selection of the peroxide or combination of peroxides is not limited to the above, but the peroxide(s) can be selected to fit the process desired. Typically, the pre-cure time can be in the range of about 20 to about 60 minutes, but this can be adjusted depending upon composition and catalyst. In one embodiment, the pre-cure time is about 30 minutes.

Penetrating polymer network structures can be generated by polyamine-initiated cross-links to the epoxidized structure at the same time other cross-linked structures are being formed (for example, by peroxide-induced free radical cross-links of unsaturated double bonds in the castor oil estolides). In addition, if a polyamine crosslinker is utilized, a carboxyl-amine reaction is possible between the acid sites and the polyamine. This latter reaction promotes additional interfacial stability and structure to the final elastomer product. In one embodiment, one or more polyamines can be used. Pre-cure temperatures when polyamines are used typically range from about 140 to about 220° C., although temperatures outside this range can be used. In one embodiment, pre-cure temperatures of about 200° C. to about 205° C. are used.

Depending on the scale of the polymerization reactions, the degree of the exotherm and the heat transfer capability of the reaction vessels will be expected to vary. In some embodiments, it can be beneficial to include one or more inert fillers in the reaction mixture, where they can act as a heat sink to help control the exothermicity of the polymerization reactions.

III. Sheets Including the Polymeric Materials

The elastomeric materials can be used to prepare surface coverings and/or surface covering components, such as floor and wall covering products, which have good mechanical properties, from renewable, natural raw materials. In addition to other desired shapes, the elastomeric materials can be formed into sheets. The sheet materials can be prepared by:

a) providing a suitable prepolymer, epoxy group-containing compound and epoxy crosslinker (including a polycarboxylic acid), optionally one or more crosslinking catalysts, and at least one additive comprising a filler, b) forming the material into a sheet form, typically by spread coating or calendering, and c) heating and mixing to a suitable processing temperature, and d) cooling the resulting sheet, optionally embossing the sheet if desired before the final cure is completed.

A variety of well-known processing equipment can be used to heat and thoroughly mix the materials. These include but are not limited to extruders, Banburys, mills and kneaders. In one embodiment, the components are intimately mixed in a high shear mixer for a suitable period of time (until materials are fully mixed) to bring the mixture into a substantially fluid state without substantially degrading the mixture.

IV. Flooring Materials Incorporating Sheets of the Polymeric Materials

The sheets formed from the elastomeric materials can be used as one or more layers in floor coverings based on conventional spread coating or calendering technology. The floor coverings include at least one layer of a sheet material formed from the polymeric material described herein. In general, homogeneous sheet flooring is formed from filled systems containing about 10% to about 90% filler by weight in a polymer matrix. Alternatively, heterogeneous floor coverings can be prepared, including two or more different layers having particular functions, bonded together. For example, floor coverings typically include a foamed layer to provide cushioning; a substrate, a solid backcoat layer; a wear layer and/or a top coat layer. Carriers or substrates such as woven or non-woven mesh or fabric, tissue, and glass webs and fibers can also be used.

The elastomeric materials described herein can be used to form a substrate layer, a wear layer, and can even be foamed using conventional foaming technology to form a foam layer. Various design features can be included as well, and the layers can be physically and/or mechanically embossed, ideally in register with a particular design pattern. Graphic images can also be incorporated into the flooring to provide an image with depth perception, as described, for example, in U.S. Pat. No. 5,347,296, the contents of which are hereby incorporated by reference in their entirety.

Foaming

For some types of applications little or no expansion in some or all layers of the floor covering structure is required. However, the floor coverings can range from those floor coverings where all layers except the topcoat are foamed to those where none of the constituent layers are foamed. The foam can be a closed cell foam. The layers can be foamed by using a chemical blowing agent. Azo compounds are especially effective. An example of this class of compounds is Azodicarbonamide (Celogen Ariz. from Uniroyal). A particularly useful feature of this compound is that its decomposition point can be reduced from 220° C. to less than 170° C. by using activators such as zinc oxide. Inhibitors such as benzotriazole can also be used. If inks containing benzotriazole are used to print on the surface of a foamable substrate or layer containing Celogen Ariz. and zinc oxide and the resulting structure, with a wear layer added over the foamable layer, is heated to temperature between the activated and inactivated decomposition temperatures, then a raised pattern (chemical embossing) is created in the sample. A supplemental blowing agent such as aluminum trihydrate can also be used, as it not only acts as a flame retardant but also gives off water vapor when heated above 200° C. A volatile fugitive processing aid or plasticizer can also have a useful role as a supplemental blowing agent.

Mechanical blowing techniques can also be used, in combination with or in place of chemical blowing agents. This typically involves mixing air or another gas in with the polymeric material under conditions that will produce the desired number and size of cells in the resulting foam. In the spread coating system the mixture as applied needs to have a foam structure near to that of desired product. In the extrusion or calendering process the gas needs to be in solution in the polymer or as small micro bubbles at the melt pressure in the extruder system. Expansion takes place as the melt leaves the extruder and goes from high pressure (about 100 to about 700 PSI) to atmospheric pressure. In both cases, it is important for the cell structure to be frozen at the desired size by a rapid drop in the sheet temperature to below that needed for cell contraction or deformation.

The present invention will be better understood with reference to the following non-limiting examples.

EXAMPLE 1

Castor oil Pre-polymerized to form Pre-polymer Estolides.

Castor oil (ricinoleic acid) and citric acid were blended in a 1:0.08 ratio (i.e. 8 parts of citric acid to 100 parts of castor oil by weight). To this solution was added 1.0% p-TSA and 2% by weight of a peroxide catalyst 101-45B-pd. This mixture was then heated to 210° C. (+or −10° C.) and held for one hour at this temperature under a nitrogen blanket with low agitation. This process produced a light colored, viscous estolide prepolymer.

EXAMPLE 2

| PPN Synthesis | |
|---|---|
| Recipe: | phr |
| a. Castor oil estolide pre-polymer of Example 1 | 100 |
| b. ESO | 267 |
| c. Sebacic acid | 133 |
| d. 2,5-dimethyl-2,5-di (tertbutylperoxy) hexane peroxide | 5.3 |
| e. Limestone | 500 |

Procedure: 100 ml of ingredient (a) was mixed with 267 grams of (b) and 133 ml of (c) in a 500 ml, one-neck flask and placed in a temperature controlled oil bath. The mixtures was heated and stirred at 142° C. for 10 minutes. 5.3 grams of (d) and 500 grams (e) were added and the mixture stirred strongly for 6 min and allowed to cool to room temperature. The resulting mixture was placed into a Petri dish and heated to 200° C. under an inert nitrogen flow for 30 minutes after which it was again allowed to cool to room temperature. This pre-cured mixture was transferred to a 6"×6"×⅛" Teflon mold and placed it in a hydraulic press. A pressure of about 5000 psi was applied to the platens. The sample was cured for 4 hours at this pressure and a temperature of 195° C. After this period of cure, the heaters were turned off and the post-cured sample allowed to cool for 30 minutes before releasing the platen pressure and removing the sample from the mold.

EXAMPLE 3

| PPN Synthesis | |
|---|---|
| Recipe: | phr |
| a. Castor oil estolide pre-polymer of Example 1. | 100 |
| b. ESO | 267 |
| c. Sebacic acid | 133 |
| d. Epoxy resin | 17 |
| e. 1,4-Diaminobutane | 17 |
| f. 2,5-Dimethyl-2,5-di (tertbutylperoxy) hexane peroxide | 5.3 |
| g. Limestone | 500 |

Procedure: 100 ml of ingredient (a) was mixed with 267 grams of (b) and 133 ml of (c) in a 500 ml, one-neck flask and placed in a temperature controlled oil bath. The mixture was heated and stirred at 142° C. for 10 minutes. 17 grams of (d), 17 grams of (e), 5.3 grams of (f) and 500 grams of (g) were added. The mixture was stirred strongly for another 10 min and then allowed to cool to room temperature. The resulting mixture was placed in a Petri dish and reheated to 200° C. while blanketing with an inert nitrogen flow for 30 minutes. Following this procedure, the sample was transferred to a 6"×6"×⅛" Teflon mold, placed in a hydraulic press, and a pressure of about 5000 psi was applied to the platens. The sample was cured for 4 hours at this pressure and 195° C. After curing, the sample was cooled for 30 minutes to room temperature and the platen pressure released and the sample sheet removed from the mold.

EXAMPLE 4

| PPN Synthesis | |
|---|---|
| Recipe: | phr |
| a. Castor oil estolide prepolymer of Example 1 | 100 |
| b. Citric acid | 5 |
| c. ESO | 265 |
| d. Sebacic acid | 130 |
| e. 2,5-dimethyl-2,5-di (tertbutylperoxy) hexane peroxide | 3 |
| f. Limestone | 500 |

Procedure: The listed amounts of ingredients (a), (c) and (d) were mixed in a 500 ml beaker. The mixture was heated and stirred at 157° C. for 0.5 hour using an inert nitrogen sparger for agitation. Components (b), (e) and (f) were added and the mixture stirred strongly for another 5 minutes before allowing the mixture to cool to room temperature. The resulting mixture was placed into a Petri dish and reheated to 200° C. with an inert nitrogen blanket for 30 minutes to form a pre-cured mixture. The pre-cured mixture was again cooled and then transferred to a 6"×6"×⅛" Teflon mold. The mixture and mold were place in a hydraulic press and a pressure of about 5000 psi applied to the platens. The sample was cured for 4 hours at this pressure and a temperature of 195° C. The sample was then cooled for about 30 minutes before the platen pressure was released and the sample removed from the mold.

EXAMPLE 5

PPN Synthesis

| Recipe: | phr |
| --- | --- |
| a. Castor oil | 100 |
| b. Citric acid | 8 |
| c. p-TSA | 1 |
| d. ESO | 300 |
| e. Sebacic acid | 150 |
| f. 2,5-dimethyl-2,5-di (tertbutylperoxy) hexane peroxide | 3 |
| g. Limestone | 500 |

Procedure: 100 ml of ingredient (a) was mixed with 10 grams of (b) and 1 gram of (c) in a 500 ml, three-neck flask and placed in a temperature controlled oil bath. The mixture was heated at 200° C. for 10 minutes until a highly viscous, amber liquid mixture was formed. In a second 600 ml beaker, 300 grams of (d) and 150 grams of (e) were mixed with 3 grams of (f). This mixture was heated to 142° C. and stirred strongly for 10 minutes. The initial viscous ingredients from the first beaker was transferred into the second beaker and stirred for about 5 minutes at 142° C. Five hundred grams of limestone were added and the mixture stirred for about 5 minutes. The resulting mixture was transferred to a Petri dish and heated to 200° C. with an inert nitrogen blanket for 30 minutes to give a pre-cured material and then cooled to room temperature. The resulting pre-cured mixture was transferred to a 6"×6"×⅛" Teflon mold and the mold inserted into a hydraulic press. A pressure of about 5000 psi was applied to the platens and the sample cured for 4 hours at this pressure and a temperature of 195° C. The cured sample was allowed to cool for 30 minutes before the pressure on the platens was released and the sample was removed.

EXAMPLE 6

PPN Synthesis

| Recipe: | phr |
| --- | --- |
| a. Castor oil | 100 |
| b. Citric acid | 10 |
| c. p-TSA | 2 |
| d. ESO | 300 |
| e. Sebacic acid | 150 |
| f. Triethylene Glycol Diamine | 10 |
| g. 2,5-dimethyl-2,5-di (tertbutylperoxy) hexane peroxide | 3 |
| h. Limestone | 500 |

The material was prepared using the same procedure as described in Example 4, except that 2 phr of p-TSA and 10 parts of triethylene glycol diamine were added into the system prior to pre-cure process.

EXAMPLE 7

PPN Synthesis

The material was prepared using the same ingredients and procedures as described for Example 4, except that 30 phr of epoxy resin and 40 phr triethylene glycol diamine were added to the mixture just prior to the pre-cure process.

EXAMPLE 8

PPN Synthesis

The material was prepared using the same ingredients and procedures as described for Example 5, except the limestone that was used was surface treated with 3% by weight of polymerized castor oil, which was applied via a solvent process.

EXAMPLE 9

PPN Synthesis

| Recipe: | phr |
| --- | --- |
| a. Castor oil | 100 |
| b. Citric acid | 10 |
| c. p-TSA | 1 |
| d. ESO | 300 |
| e. Sebacic acid | 150 |
| f. 2,5-Dimethyl-2,5-di (tertbutylperoxy) hexane peroxide | 3 |
| g. Dicumyl peroxide | 2 |
| h. Tri-ethylene glycol diamine | 15 |
| i. Epoxy resin | 5 |
| j. Limestone | 500 |

Procedure: 100 ml of ingredient (a) was mixed with 10 grams of (b) and 1 gram of (c) in a 1 Liter, three-neck flask and surrounded with a temperature-controlled heating mantle. The mixture was heated at 200° C. for 10 minutes with nitrogen agitation until a highly viscous amber liquid formed. The temperature was reduced to 135° C. and 300 grams of (d), 150 grams of (e), 3 grams of (f), 2 grams of (g), 15 grams (h), 5 grams of (i) and 500 grams of (j) were added. The mixture was stirred strongly for another 5 min and then quickly transferred into a Petri dish. The mixture in the dish was heated to 150° C. under an inert nitrogen flow for 30 minutes. The pre-cured mixture was transferred to a 6"×6"×⅛" Teflon mold, which was inserted into a parallel platen, hydraulic press. A pressure of about 5000 psi was applied to the platens and the sample cured for 4 hours at this pressure and a temperature of 195° C. The cured sample was allowed to cool for 30 minutes before the platen pressure was released and the post-cured sample was removed from the mold.

EXAMPLE 10

| Recipe: | phr |
| --- | --- |
| a. Castor oil | 100 |
| b. ESO | 260 |
| c. Sebacic acid | 140 |
| d. TGDDM epoxy resin | 20 |
| e. 2,5-Dimethyl-2,5-di (tertbutylperoxy) hexane peroxide | 3 |
| f. Limestone | 1300 |

Procedure: 100 ml of ingredient (a) was mixed with 260 grams of (b) and 140 grams of (c) in a 1000 ml beaker. The mixture was heated to 155° C. under mechanical agitation. 20 grams of (d) was added and the mixture was stirred strongly for 2 minutes. 3 grams of (e) was added and the mixture was stirred strongly for 1 minute. Finally 1300 grams of (f) were added and the mixture was stirred strongly for another 1 minute and then quickly transferred into a Petri dish. The mixture in the dish was heated to 150° C. under an inert nitrogen flow for 17 minutes. The pre-cured mixture was transferred to a 6"×6"×⅛" Teflon mold, which was inserted into a parallel platen, hydraulic press. A pressure of about 5000 psi was applied to the platens and the sample cured for 0.5 hours at this pressure and a temperature of 195° C. The cured sample was allowed to cool for 30 minutes before the platen pressure was released and the post-cured sample was removed from the mold.

The mechanical physical property data obtained from the sample elastomers produced according to these examples is shown below in Table 1.

TABLE 1

Summary of the mechanical properties for the sample elastomers prepared according to the procedures outlined in Examples 2, 3, 5 to 8, 10 and 11.

| Properties | ASTM | Unit | Example 2 | Example 3 | Example 5 | Example 6 | Example 7 | Example 8 | Example 10 | Example 11 |
| --- | --- | --- | --- | --- | --- | --- | --- | --- | --- | --- |
| Density | D-792 | g/cm$^3$ | 1.64 | 1.54 | 1.53 | 1.49 | 1.39 | 1.46 | 2.56 | 2.50 |
| Tensile strength | D-638 | MPa | 0.6 | 14.3 | 0.62 | 0.37 | 0.88 | 0.70 | 2.41 | 1.79 |
| Tensile Modulus | D-638 | MPa | 2.85 | 41.5 | 1.53 | 1.08 | 1.94 | 1.44 | 5.51 | 6.20 |
| Elongation at break | D-638 | % | 21 | 34.6 | 47.1 | 40.3 | 74.6 | 61.4 | 11.0 | 5.0 |
| Hardness Rex Type A Durometer Model 1600 | D-2240 | | A75, Creep 12 after 15 sec | A75, Creep 7 after 15 sec | A57, Creep 15 after 15 sec | A42, Creep 10 after 15 sec | A54, Creep 8 after 15 sec | A55, Creep 12 after 15 sec | A84 Creep 5 after 15 sec | A80 Creep 7 after 15 sec | strongly for 2 minutes. 3 gram of (e) was added and the mixture was stirred strongly for 1 minute. Finally 1300 grams of (f) were added and the mixture was stirred strongly for another 1 minute and then quickly transferred into a Petri dish. The mixture in the dish was heated to 150° C. under an inert nitrogen flow for 17 minutes. The pre-cured mixture was transferred to a 6"×6"×⅛" Teflon mold, which was inserted into a parallel platen, hydraulic press. A pressure of about 5000 psi was applied to the platens and the sample cured for 0.5 hours at this pressure and a temperature of 195° C. The cured sample was allowed to cool for 30 minutes before the platen pressure was released and the post-cured sample was removed from the mold.

EXAMPLE 11

| Recipe: | phr |
| --- | --- |
| a. Castor oil | 100 |
| b. ESO | 260 |
| c. Sebacic acid | 140 |
| d. Tetra Acrylate (Ebecryl ® 140) | 20 |
| e. 2,5-Dimethyl-2,5-di (tertbutylperoxy) hexane peroxide | 3 |
| f. Limestone | 1300 |

Procedure: 100 ml of ingredient (a) was mixed with 260 grams of (b) and 140 grams of (c) in a 1000 ml beaker. The mixture was heated to 155° C. under mechanical agitation.

Enzymatic Esterification of Ricinoleic acid to Form Estolide Prepolymers

The following is an example of a procedure used for enzyme-catalyzed polymerization process. Ricinoleic acid (approximately 10 ml) was weighed and charged to a 50 ml Erlenmeyer flask, which was placed in an oil bath maintained at a constant temperature in the range of 60–70° C. Under strong stirring, the system pressure was reduced to 20 in-Hg and maintained at this level until the solution reached a bubble-free state. Then the vacuum in the Erlenmeyer was broken and, based on the original mass of ricinoleic acid, ten percent (10%) by weight of lipase enzyme was added to the Erlenmeyer flask. The temperature controller of the oil bath was set to 80° C., which was midway in the optimal temperature range of 70–90° C. The stirring rate was reduced to 150 rpm, and the pressure of 20 in-Hg vacuum reapplied. These conditions of temperature and pressure were maintained for seventy-two (72) hours, during which the partial polymerization reactions to form estolides occurred. The stirring rate was periodically readjusted over time to compensate for the increased viscosity of the solution due to the gradual polymerization.

Following the seventy-two (72) hours of reaction time, the pre-polymer estolide solution was filtered to isolate and remove the enzyme-coated beads. Gauze PadsT marketed by Johnson& Johnson were used as the filtration medium. The filtered enzyme beads were then washed in a soxhlet extractor with acetone, with the residual acetone being evaporated, and the washed and dried enzyme coated beads stored in a refrigerator at 2–8° C. for later reuse. In one embodiment, the enzyme used to form the estolide solution was a hydrolysis lipase B from *Candida Antarctic*. In our case this enzyme was immobilized on porous acrylate resin beads and had an initial specified activity of 7000 PLU/g.

The following synthetic examples are representative of the synthesis of the elastomeric materials described herein.

EXAMPLE 12

| Recipe: | Percent by Weight |
|---|---|
| a. Estolides (Ricinoleic acid prepolymer) | 29.1 |
| b. Epoxy resin DEGBA | 20.8 |
| c. Diethylenetriamine | 20.8 |
| d. MEK peroxide | 0.2 |
| e. Wood Flour | 29.1 |

Procedure: The specified or proportional amount was mixed by weight of ricinoleic acid estolides with the epoxy resin and diethylenetriamine hardener, plus 0.2% MEK peroxide in a container and stirred strongly for ten minutes (10 min.). Then the desired amounts of wood flour having a particle size of 200 mesh (0.074 mm) was added to the mixture and stirred for another ten minutes (10 min.) until a fluid, gel was formed. The mixture was allowed to set for 1 hour and then placed into a 4"×4"×1/16" Teflon T-frame mold. The mold was inserted into a parallel platen press and hydraulic pressure of 5000 psi was applied. Holding that pressure, the sample was cured overnight, or for approximately twelve hours (12 hours), at ambient room temperature. The sample was post cured at 60° C. for four (4) hours, then the mold pressure was released after the pressed sample had cooled for 20 min.

EXAMPLE 13

| Recipe: | Percent by Weight |
|---|---|
| a. Estolides (Ricinoleic acid prepolymer) | 24.5 |
| b. Epoxy resin DEGBA | 12 |
| c. Diethylenetriamine | 13 |
| d. Dibenzoyl peroxide | 1 |
| e. Limestone | 49.5 |

Procedure: Ricinoleic acid estolides was mixed with epoxy resin and polyamine hardener, plus one percent (1%) dibenzoyl peroxide in a container and then stirred strongly for 10 min. The required amounts of limestone was added to the mixture and stirred for another 10 min until a gel or viscous liquid like suspension was formed. The mixture was allowed to set for 1 hour and then placed into a 4"×4"×1/16" Teflon T mold. The mold was then inserted between the platens of a hydraulic press, and a pressure of 5000 psi was applied. The mixture was cured with a temperature of 85° C. for 1.5 hours and 120° C. for 3 hours.

EXAMPLE 14

| Recipe: | Percent by Weight |
|---|---|
| a. Estolides(Ricinoleic acid prepolymer) | 10.7 |
| b. Epoxy resin DEGBA | 10.7 |
| c. Diethylenetriamine | 10.7 |
| d. Epoxidized Soybean Oil | 10.7 |

-continued

| Recipe: | Percent by Weight |
|---|---|
| e. MEK peroxide | 0.15 |
| f. Limestone | 54 |
| g. TiO$_2$ | 3 |

Procedure: The ricinoleic acid estolides was mixed with the epoxy resin, polyamine hardener, and epoxidized soybean oil, plus 0.15% MEK peroxide in a container and stirred strongly for ten minutes (10 min.). The required amounts of filler was added to the mixture and stirred for another ten minutes (10 min.) until a gel like suspension was formed. A sample of this mixture was placed into a 4"×4"×1/16" TeflonT mold, and the mold was inserted in a hydraulic press and pressure of 5000 psi was applied at room temperature for 12 hours.

EXAMPLE 15

| Recipe: | Percent by Weight |
|---|---|
| a. Estolides (Ricinoleic acid prepolymer) | 16.6 |
| b. Epoxy resin DEGBA | 16.6 |
| c. Diethylenetriamine | 16.6 |
| d. Epoxidized Soybean Oil | 16.6 |
| e. MEK peroxide | 0.23 |
| f. Wood Flour | 23.3 |
| g. TiO2 | 10 |

Procedure: The same procedure as described in example 3 was used except filler was replaced by wood flour with particle size 200 mesh.

EXAMPLE 16

| Recipe: | Percent by Weight |
|---|---|
| a. Estolides (Ricinoleic acid prepolymer) | 10.6 |
| b. Epoxy resin DEGBA | 9.5 |
| c. Diethylenetriamine | 11.6 |
| d. Epoxidized Soybean Oil | 10.6 |
| e. Dibenzoyl peroxide | 0.4 |
| f. Triethylene Glycol Diamine | 0.4 |
| g. Limestone | 53 |

Procedure: The desired amount of ricinoleic acid estolides was mixed by weight with epoxy resin and epoxidized soybean oil in a 100 ml beaker. The mixture was stirred strongly and 11.6% polyamine and 0.4% triethyleneglycol diamine hardeners and 0.4% benzyl peroxide was added to the container and stirred strongly for another five minutes (5 min.). The limestone filler was charged to the mixture and stirred for another ten minutes (10 min.) until a gel or viscous liquid was formed. The mixture was allowed to set for 1 hour and placed into a 4"×4"×1/16" TeflonT mold. The mold was then inserted into a heated press and hydraulic oil pressure of 5000 psi was applied with a constant temperature of 90° C. for two hours.

EXAMPLE 17

| Recipe: | Percent by Weight |
|---|---|
| a. Estolides (Ricinoleic acid prepolymer) | 7.6 |
| b. Epoxy resin DEGBA | 10.6 |
| c. Diethylenetriamine | 11 |
| d. Epoxidized Soybean Oil | 7.6 |
| e. Triethylene Glycol Diamine | 2.3 |
| f. MEK | 0.4 |
| g. Limestone | 61 |

Procedure: A desired amount of ricinoleic acid estolides was mixed by weight with epoxy resin with a petroleum-based polyamine hardener, Epoxidized Soybean Oil, Triethylene Glycol Diamine and MEK peroxide in a container and stirred strongly for 10 minutes. The limestone filler was charged to the mixture and stirred for another ten minutes (10 min.) until a gel or viscous fluid like suspension was formed. The mixture was then set into an isolated vessel and heated up to 180° C. under a nitrogen blanket for 1 hour until an immobile semi-solid was formed. The precured mixture was transferred into a 4"×4"×1/16" TeflonT mold and the mold was inserted into a heated press and a hydraulic oil pressure of 5000 psi was applied with a constant temperature of 180° C. for four hours.

Physical property data obtained from experimental samples cut from the sheets produce by the procedures described in the preceding six examples are listed in

TABLE 2

Summary of the physical properties for the elastomers in Examples 12–17

| | ASTM | Unit | Example 12 | Example 13 | Example 14 | Example 15 | Example 16 | Example 17 |
|---|---|---|---|---|---|---|---|---|
| Density | D-792 | g/cm³ | 0.99 | 1.66 | 1.57 | 1.14 | 1.57 | 1.67 |
| Tensile strength | D-638 | MPa | 2.67 | 0.40 | 0.30 | 1.64 | 0.58 | 1.09 |
| Tensile Modulus | D-638 | MPa | 2.98 | 0.47 | 0.75 | 2.94 | 3.22 | 4.22 |
| Elongation at break | D-638 | % | 94.9 | 180.0 | 136.5 | 55.8 | 24.6 | 262.5 |
| Hardness Rex Type A Durometer Model 1600 | ASTM D2240 | | A 66, Creep 12 at 15 s | A 57, Creep 14 at 15 s | A 60, Creep 7 at 15 s | A 76, Creep 13 at 15 s | A53, Creep 14 at 15 s | A80, Creep 26 at 15 s |

The data in Tables 1 and 2 show that the elastomeric compositions have properties suitable for use as or inclusion in sheet materials for flooring products.

Compositions having in following ranges of components by weight based on the total weight of the composition have properties which permit use of the cured compositions in floor coverings: about 5% to about 15% by weight of ricinoleic acid estolide, about 0.05% to about 0.4% by weight of crosslinking catalyst (0.05% to about 0.2% by weight of the methyl ethyl ketone peroxide in one embodiment and about 0.05% to about 4% by weight of the benzoyl peroxide in another embodiment), about 5% to about 30% by weight of epoxy-group containing compound, about 5% to about 15% by weight of epoxy hardener, about 3% to about 80% by weight of filler (about 18% to about 80% by weight of limestone in one embodiment and about 3% to about 33% by weight of wood flour in another embodiment), about 5% to about 30% by weight of epoxidized soybean oil, and about 5% to about 30% by weight of epoxy resin, Having disclosed the subject matter of the present invention, it should be apparent that many modifications, substitutions and variations of the present invention are possible in light thereof. It is to be understood that the present invention can be practiced other than as specifically described. Such modifications, substitutions and variations are intended to be within the scope of the present application.

We claim:

1. A composition comprising
   a) a ricinoleic acid component selected from the group consisting of castor oil, ricinoleic acid, castor oil estolide, ricinoleic acid estolide and combinations thereof,
   b) an epoxidized vegetable oil, and
   c) a polycarboxylic acid crosslinker.

2. The composition of claim 1, further comprising an additional component selected from the group consisting of a crosslinking catalyst, a filler and combinations thereof.

3. The composition of claim 2, wherein the crosslinking catalyst is a free radical generating catalyst.

4. The composition of claim 3, wherein the crosslinking catalyst is a thermally activated free radical initiator.

5. The composition of claim 1, wherein the composition further comprises a free radical generating catalyst selected from the group consisting of 2,5-dimethyl-2,5-di(tert-butylperoxy)hexane, 1,4-di-(2-tert-butylperoxyisopropyl) benzene, tert-butyl cumyl peroxide, di-tert-butyl peroxide, 2,4,4-trimethylpentyl-2-hydroperoxide, diisopropylbenzene monohydroperoxide, cumyl hydroperoxide, 2,5-dimethyl-2,5-di(tert-butylperoxy)hexane peroxide, methyl ethyl ketone peroxide, dicumyl peroxide, dibenzoyl peroxide and combinations thereof.

6. The composition of claim 2, wherein the filler is selected from the group consisting of wood flour, limestone, titanium dioxide, kaolin clay and combinations thereof.

7. The composition of claim 2, wherein the filler comprises powdered limestone.

8. The composition of claim 1, wherein the epoxidized vegetable oil is epoxidized soybean oil.

9. The composition of claim 1, wherein the crosslinker comprises a polycarboxylic acid and another crosslinker selected from the group consisting of a polyfunctional amine, a polyacrylate and combinations thereof.

10. The composition of claim 1, wherein the polycarboxylic acid is selected from the group consisting of sebacic acid, citric acid and combinations thereof.

11. The composition of claim 9, wherein the polyfunctional amine is selected from the group consisting of isophoronediamine, 1,2-diaminocyclohexane, bis-p-aminocyclohexylmethane, 1,3-bis(aminomethylcyclohexanemine) cycloaliphatic diamines, diethylenetriamine, 4,4'-isopropylidenediamine, 1,4-diaminobutane, triethylene glycol diamine, and combinations thereof.

12. The composition of claim 1, wherein the epoxy group-containing compound comprises a combination of an epoxy resin and an epoxidized vegetable oil.

13. The composition of claim 1, wherein the ricinoleic acid component is a ricinoleic acid estolide.

14. The composition of claim 13, wherein the ricinoleic acid component is an estolide prepared by enzyme-catalyzed polymerization.

15. The composition of claim 14, wherein the enzyme is a lipase derived from *Candida Antarctica* B.

16. A composition comprising the reaction product of the composition of claim 1.

17. A composition comprising the reaction product of a composition comprising an additional component selected from the group consisting of a crosslinking catalyst, a filler and combinations thereof, and the composition of claim 16.

18. The composition of claim 17, wherein the additional component is a crosslinking catalyst selected from the group consisting of 2,5-dimethyl-2,5-di(tert-butylperoxy)hexane, 1,4-di-(2-tert-butylperoxyisopropyl) benzene, tert-butyl cumyl peroxide, di-tert-butyl peroxide, 2,4,4-trimethylpentyl-2-hydroperoxide, diisopropylbenzene monohydroperoxide, cumyl hydroperoxide, 2,5-dimethyl-2,5-di(tert-butylperoxy)hexane peroxide, methyl ethyl ketone peroxide, dicumyl peroxide, dibenzoyl peroxide and combinations thereof.

19. The composition of claim 16, wherein the crosslinker comprises a polycarboxylic acid and another crosslinker selected from the group consisting of a polyfunctional amine, a polyacrylate and combinations thereof.

20. The composition of claim 19, wherein the other crosslinker is selected from the group consisting of isophoronediamine, 1,2-diaminocyclohexane, bis-p-aminocyclohexylmethane, 1,3-bis(aminomethylcyclohexanamine)cycloaliphatic diamines, diethylenetriamine, 4,4'-isopropylidenediamine, 1,4-diaminobutane, triethylene glycol diamine and combinations thereof.

21. The composition of claim 19, wherein the epoxidized vegetable oil is epoxidized soybean oil.

22. The composition of claim 19, wherein the ricinoleic acid component is an estolide prepared by enzyme-catalyzed polymerization.

23. The composition of claim 5, wherein the free radical generating catalyst is 2,5-dimethyl-2,5-di(tert-butylperoxy)hexane.

24. The composition of claim 10, further comprising a free radical generating catalyst selected from the group consisting of 2,5-dimethyl-2,5-di(tert-butylperoxy)hexane, 1,4-di-(2-tert-butylperoxyisopropyl)benzene, tert-butyl cumyl peroxide, di-tert-butyl peroxide, 2,4,4-trimethylpentyl-2-hydroperoxide, diisopropylbenzene monohydroperoxide, cumyl hydroperoxide, 2,5-dimethyl-2,5-di(tert-butylperoxy)hexane peroxide, methyl ethyl ketone peroxide, dicumyl peroxide, dibenzoyl peroxide and combinations thereof.

25. The composition of claim 24, wherein the free radical generating catalyst is 2,5-dimethyl-2,5-di(tert-butylperoxy)hexane.

26. A composition comprising
a) a ricinoleic acid component selected from the group consisting of castor oil, ricinoleic acid, castor oil estolide, ricinoleic acid estolide and combinations thereof,
b) an epoxy group-containing compound selected from the group consisting of epoxy resins, epoxidized vegetable oils and combinations thereof,
c) a crosslinker selected from the group consisting of sebacic acid, citric acid and combinations thereof, and
d) a free radical generating catalyst selected from the group consisting of 2,5-dimethyl-2,5-di(tert-butylperoxy)hexane, 1,4-di-(2-tert-butylperoxyisopropyl)benzene, tert-butyl cumyl peroxide, di-tert-butyl peroxide, 2,4,4-trimethylpentyl-2-hydroperoxide, diisopropylbenzene monohydroperoxide, cumyl hydroperoxide, 2,5-dimethyl-2,5-di(tert-butylperoxy)hexane peroxide, methyl ethyl ketone peroxide, dicumyl peroxide, dibenzoyl peroxide and combinations thereof.

27. The composition of claim 26, wherein the epoxy group-containing compound is epoxidized soybean oil.

28. A composition comprising
a) a fatty acid component selected from the group consisting of castor oil, castor oil estolide, ricinoleic acid estolide and combinations thereof,
b) an epoxy group-containing compound selected from the group consisting of epoxy resins, epoxidized vegetable oils and combinations thereof, and
c) a crosslinker selected from the group consisting of sebacic acid, citric acid and combinations thereof.

29. The composition of claim 28, wherein the epoxy group-containing compound is epoxidized soybean oil.

30. The composition of claim 28, further comprising a free radical generating catalyst selected from the group consisting of 2,5-dimethyl-2,5-di(tert-butylperoxy)hexane, 1,4-di-(2-tert-butylperoxyisopropyl)benzene, tert-butyl cumyl peroxide, di-tert-butyl peroxide, 2,4,4-trimethylpentyl-2-hydroperoxide, diisopropylbenzene monohydroperoxide, cumyl hydroperoxide, 2,5-dimethyl-2,5-di(tert-butylperoxy)hexane peroxide, methyl ethyl ketone peroxide, dicumyl peroxide, dibenzoyl peroxide and combinations thereof.

31. The composition of claim 16, wherein the epoxy group-containing compound comprises a combination of an epoxy resin and an epoxidized vegetable oil.

32. The composition of claim 16, wherein the ricinoleic acid component is a ricinoleic acid estolide.

33. The composition of claim 32, wherein the ricinoleic acid component is an estolide prepared by enzyme-catalyzed polymerization.

34. The composition of claim 33, wherein the enzyme is a lipase derived from *Candida Antarctica* B.

* * * * *